United States Patent [19]  [11]  3,841,581.
Salamon  [45]  Oct. 15, 1974

[54] LOCKING MECHANISM FOR A VEHICLE BODY RESTRAINT BELT RETRACTOR

[75] Inventor: Theodore M. Salamon, Warren, Mich.

[73] Assignee: General Motors Corporation, Detroit, Mich.

[22] Filed: May 21, 1973

[21] Appl. No.: 361,946

[52] U.S. Cl. ............................ 242/107.4, 188/140
[51] Int. Cl. ...................... A62b 35/02, B65h 63/00
[58] Field of Search ....... 242/107.4, 107.5 B, 107.2, 242/107.3, 107 S, 107 R; 297/386, 387, 388; 280/150 B; 188/135

[56] References Cited
UNITED STATES PATENTS
| | | | |
|---|---|---|---|
| 2,923,492 | 2/1960 | Walpole et al. | 242/107.4 |
| 3,226,053 | 12/1965 | Petty | 242/107.4 |
| 3,237,729 | 3/1966 | Proctor | 242/107 SB |
| 3,578,260 | 5/1971 | Kell | 242/107.4 |

Primary Examiner—George F. Mautz
Assistant Examiner—Jon W. Henry
Attorney, Agent, or Firm—J. A. Kushman

[57] ABSTRACT

A locking mechanism for a vehicle body restraint belt retractor that provides locking during abrupt vehicle deceleration in a forward direction by the combined action of inertial and belt reel responsive stages of locking actuation. During the initial vehicle deceleration, an inertia member pivoted to the retractor housing swings forwardly and carries a tapered face of an arcuate friction member into engagement with the end of a shaft which rotates with the belt reel of the retractor. A vehicle body occupant restrained by the belt wound on the reel moves forwardly during this vehicle deceleration and the consequent belt reel rotation causes the initial shaft and friction member engagement to drive the inertia member forwardly and engage the rotating shaft with an arcuate surface of the friction member that is generated about the pivotal support axis of the inertia member. This engagement drives the inertia member to an actuated position while a control arm of this member moves into engagement with a cooperable control arm of a locking member on the retractor housing so as to move the locking member against a spring bias to a locked position where the belt reel is engaged by the locking member to prevent subsequent belt unwinding. The inertia member is pivoted to the housing above the shaft and defines an arcuate aperture in which the friction member is carried, and the shaft is received within this aperture such that the locking mechanism is compact and does not appreciably enlarge the size of the retractor.

3 Claims, 3 Drawing Figures

PATENTED OCT 15 1974  3,841,581

SPIRAL SPRING

SPRING BIAS

LOCKING MECHANISM FOR A VEHICLE BODY RESTRAINT BELT RETRACTOR

BACKGROUND OF THE INVENTION

This invention relates generally to a locking mechanism for a vehicle body restraint belt retractor.

Vehicle body restraint belt retractors may include locking mechanisms that are actuated in various ways. The retractor may utilize a reel sensing inertia locking mechanism that locks the retractor belt reel against rotation when the belt is being pulled out or extended at a rate above a predetermined level. The retractor also may be of the automatic locking type where reel rotation and belt extension is prevented upon the initial belt retraction after the belt is first pulled from a fully wound or stored position within the retractor. It is also known to provide a restraint belt retractor with a pendulum type locking actuation in which swinging movement of a pendulum in response to abrupt vehicle acceleration or deceleration causes a locking member to move to a locked position and thereby prevent reel rotation and belt extension.

SUMMARY OF THE INVENTION

The present invention provides a vehicle body restraint belt retractor in which locking is provided by the sequential movement of an inertia member in response to deceleration of the forward rate of vehicle movement, and by frictional engagement of the inertia member with the rotating belt reel of the retractor so as to drive the inertia member to an actuated position. During the initial vehicle deceleration, the inertia member swings forwardly about a pivotal support on the retractor housing and carries a tapered face of an arcuate friction member into engagement with a shaft that rotatably supports the belt reel on the retractor housing. A vehicle body occupant restrained by the belt wound on the reel moves forwardly during this vehicle deceleration and consequent belt reel rotation causes the shaft and friction member engagement to drive the inertia member forwardly and engage the rotating shaft with an arcuate surface of the friction member that is generated about the pivotal support axis of the inertia member. This engagement drives the inertia member to an actuated position while a control arm on this member engages a cooperable control arm of a locking member of the retractor so as to move the locking member against a spring bias to a locked position in engagement with the belt reel and to thereby prevent belt reel rotation and belt unwinding. The inertia member is pivoted above the belt reel shaft and defines an arcuate aperture in which the friction member is carried. The shaft is received within this aperture in a manner which minimizes the size of the locking mechanism and, consequently, the size of the retractor.

BRIEF DESCRIPTION OF THE DRAWINGS

The objects, features and advantages of the present invention are readily apparent from the following detailed description of the preferred embodiment and the drawings in which.

DETAILED DESCRIPTION OF THE PREFERRED EMBODIMENT

Figures 1, 2, 3:
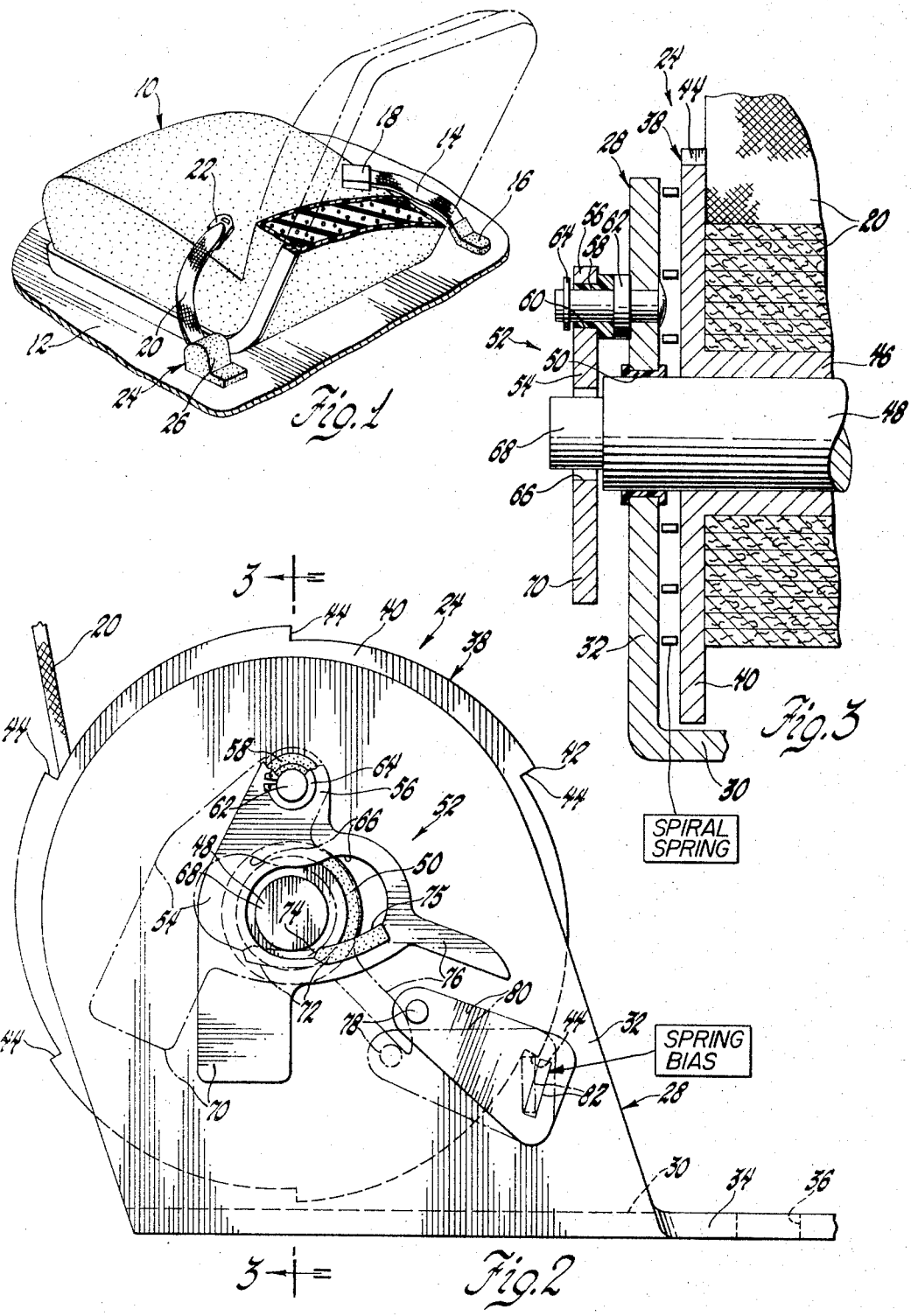
FIG. 1 is a partially broken away perspective view of a vehicle body seat supported on a vehicle floor pan which also carries a restraint belt retractor with a locking mechanism according to this invention.
FIG. 2 is an end view of the belt retractor shown in FIG. 1 with its cover removed so as to reveal the locking mechanism which is shown in a solid line indicated unlocked position and a phantom line indicated locked position.
FIG. 3 is a partial sectional view of the belt retractor taken generally along line 3—3 of FIG. 2.

Reference should now be made to FIG. 1 of the drawings which discloses a vehicle body bucket type seat 10 mounted in a conventional manner on the vehicle body floor pan 12. Adjacent one side of seat 10, a fixed length of restraint belt 14 has its lower end secured to the floor pan by a conventional attachment that is covered by a plastic boot 16. The free end of belt 14 attaches to a conventional belt buckle indicated by 18. On the other side of seat 10 a second belt 20 has a free end attached to a D-ring 22 which is selectively attachable to buckle 18 so that the belts 14 and 20 cooperate to restrain a vehicle occupant in seated position on seat 10. The lower end of belt 20 is received by a belt retractor 24 whose locking mechanism is constructed according to this invention but is hidden in FIG. 1 by a suitable retractor cover 26.

Referring additionally to FIGS. 2 and 3, the belt retractor 24 includes an integral housing 28 consisting of a base 30 extending between the lower ends of a pair of upstanding side walls 32, only one of which is illustrated by the drawings. Adjacent the rearward end of the retractor, or its right-hand end, as viewed in FIG. 2, the base 30 includes an integral mounting flange 34 which defines an aperture 36. A suitable mounting bolt, not shown, is received by this aperture so as to attach the retractor to the floor pan 12.

The belt 20 associated with retractor 24 is received by a belt reel 38 located between the side walls of the retractor housing. This belt reel includes a pair of end plates 40 located on the opposite sides of the belt 20 so as to stack the belt in an aligned manner when it is wound on the reel, and the outer peripheries of these end plates define annular ratchet configurations 42 with a number of circumferentially spaced locking surfaces 44. A drum portion 46 of the belt reel on which the belt 20 is wound extends between the end plates 40 and receives a shaft 48 extending between the side walls 32 of the retractor housing. The drum and shaft are splined or otherwise suitably fixed relative to each other so as to prevent relative rotation between them. Also, the opposite ends of the shaft 48 are received by suitable plastic bushings 50 located within apertures in the retractor side walls 32 so as to rotatably support belt reel 38 in a generally frictionless manner. A suitable spiraling spring, not shown, extends between the FIG. 3 right hand end of shaft 48 and the adjacent side wall 32 of the retractor housing so as to bias the belt reel 38 in a belt winding direction, counterclockwise as viewed in FIG. 2, and the belt 20 is thus normally wound on the belt reel.

To utilize belt 20, a seated occupant extends the belt from the retractor against the bias of the belt reel spiraling spring, and attaches the D-ring 22 to buckle 18. An occupant belted in this manner is normally free to move about on seat 10 by overcoming the winding bias of belt reel 38 to provide belt extension and a belt length allowing such movement. However, when the vehicle including floor pan 12 is being subjected to abrupt deceleration of its rate of forward movement, a locking mechanism 52 according to this invention acts in cooperation with belt reel 38 to prevent extension of belt 20 and to thereby restrain the belted occupant on the seat 10.

The locking mechanism 52 includes an inertia member 54 with an upper support lobe 56 located above the adjacent outer end of shaft 48. A suitable plastic support bushing 58, see FIG. 3, is received by an aperture 60 in the support lobe 56 and is supported by a support pin 62 mounted on the adjacent side wall 32 of the retractor housing. A rounded horseshoe-shaped snap clip 64 is snapped into a suitable groove on the outer end of support pin 62 so as to limit outward movement of the inertia member 54 away from the adajcent side wall 32. Below the support lobe 56, the inertia member 54 defines an arcuate aperture 66 receiving a reduced diameter or annular driving portion 68 on the outer end of shaft 48. This aperture 66 is generated about the axis of pin 62 so that inertia member 54 can swing about pin 62 between its solid and phantom line indicated positions in FIG. 2. The inertia member 54 also includes a weight portion 70 depending downwardly below the FIG. 2 left-hand end of aperture 66.

When the vehicle carrying retractor 10 is subjected to abrupt deceleration of its forward rate of movement, the inertial mass of inertia member 54 causes this member to swing forwardly or clockwise about pin 62 from the solid line indicated rest position shown in FIG. 2. This swinging movement of the inertia member carries an arcuate friction member 72 suitably supported on the lower wall of aperture 66 toward the driving portion 68 of shaft 48. A tapered face 74 on the left-hand end of the friction member is located approximately midway between the ends of aperture 66, and moves into engagement with the driving portion 68 of the shaft after the inertia member has swung to an intermediate position about halfway to the phantom line indicated position. During this swinging movement of the inertia member, inertia forces will also move the belted occupant forward and will thus extend belt 20 from the retractor 24. This belt extension, due to the direction the belt is wound on the belt reel 38, causes the shaft 48 and its driving portion 68 to rotate in a clockwise direction as viewed in FIG. 2. Consequently, as the rotating driving portion 68 of the shaft first frictionally engages the tapered face 74 of the friction member, it drives the friction member and inertia member to the left and moves up onto an upper arcuate friction surface 75 of the friction member, which surface is also generated about the axis of pin 62. Thereafter, the rotating driving portion 68 drives the inertia member to its phantom line indicated actuated position of FIG. 2.

As the inertia member 54 moves from its intermediate position to its actuated position under the impetus of the rotating driving portion 68, a control arm 76 of the inertia member moves into engagement with a control pin 78 carried by a control arm 80 of a locking member 82 of the retractor. The continued clockwise movement of inertia member 54 with the control arm 76 and control pin 78 engaged moves the locking member 82 counterclockwise against a spring bias, not shown, from its solid line indicated unlocked position of FIG. 2 to its phantom line indicated locked position. This locking movement of the locking member 82 thus causes it to engage a selected pair of locking surfaces 44 on the end plates of belt reel 38 and to thus prevent further extension of belt 20 from retractor 24 so that the belted occupant is thus restrained.

After the abrupt vehicle deceleration has subsided and the occupant has moved rearwardly in seat 10 to his or her original position, the spring bias of belt reel 38 rotates driving portion 68 counterclockwise to drive the inertia member back toward its rest position, and the spring bias of locking member 82 cooperates with the driving portion to move the inertia member in the same direction by way of the control arms 76 and 80 of the locking mechanism. When the inertia member 54 has been driven back to its intermediate position, the driving portion 68 of the belt reel disengages the friction member 72 and the inertia member 54 then falls in a pendulum-like manner to its solid line indicated rest position of FIG. 2. Thereupon, the spring bias of locking member 82 will return the locking member 82 to its unlocked position so that subsequent extending movement of belt 20 is possible.

It is important to note that the control arm 76 on the inertia member 54 should not move into engagement with the control pin 78 on the locking member arm 80 until the driving portion 68 of shaft 48 has moved from the tapered face 74 of the friction member 72 onto the arcuate friction surface 75. If this stricture is not complied with, the bias of locking member 82 may apply a greater counterclockwise torque to the inertia member 54 than the clockwise torque resulting from the friction generated between the rotating driving portion 68 and the tapered face 74 of the friction member. This situation could cause the driving portion 68 to spin on the tapered face and never ride onto the arcuate friction surface 75 of the friction member so as to complete locking actuation of the retractor. To reduce the possibility of this situation occurring, it is possible for the driving portion 68 to be composed of a suitable friction material, such as rubber, and to thus increase the friction generated between the friction member and the driving portion of the belt reel. This increase in friction will increase the clockwise torque the driving portion 68 supplies to the inertia member so as to ensure the locking of the retractor.

While it is not shown by the drawings, it should be understood that this locking mechanism can be used on a shoulder belt retractor as well as with a lap belt retractor in the manner disclosed.

It is believed evident from the foregoing description that this invention provides an improved locking mechanism for a vehicle body restraint belt retractor by utilizing this sequential dual mode of locking actuation.

What is claimed is:

1. In a vehicle body restraint belt retractor including a housing adaptable to be mounted on a vehicle body, a belt reel rotatably supported by the housing, spring means biasing the reel in a belt winding direction, a belt normally wound on the reel and unwound therefrom for positioning in an occupant restraining position, circumferentially spaced locking surfaces on the reel facing in the direction of unwinding belt movement, a locking member mounted on the housing for movement between a locked position where it is engageable with a selected locking surface on the reel to prevent belt unwinding and an unlocked position where these components are disengaged so as to allow belt unwinding, and spring means biasing the locking member to unlocked position, a mechanism for actuating the locking of the retractor comprising the combination of:
- an inertia member mounted on the retractor housing for movement from a rest position to an intermediate position under the impetus of vehicle deceleration forces acting directly on the mass of the inertia member during forward vehicle deceleration of a predetermined abruptness;
- annular driving means rotatable with the belt reel and engageable with the inertia member as it moves to the intermediate position so that reel rotation resulting from belt unwinding as a belted occupant moves forwardly during the vehicle deceleration causes the driving means to move the inertia member to an actuated position; and
- control portions on the inertia member and locking member which are engaged as the inertia member moves to the actuated position so as to move the locking member against the bias of its spring means to locked position to thereby prevent reel rotation and further belt unwinding.

2. In a vehicle body restraint belt retractor including a housing adaptable to be mounted on a vehicle body, a belt reel rotatably supported by the housing, spring means biasing the reel in a belt winding direction, a belt normally wound on the reel and unwound therefrom for positioning in an occupant restraining position, circumferentially spaced locking surfaces on the reel facing in the direction of unwinding belt movement, a locking member mounted on the housing for movement between a locked position where it is engageable with a selected locking surface on the reel to prevent belt unwinding and an unlocked position where these components are disengaged so as to allow belt unwinding, and spring means biasing the locking member to unlocked position, a mechanism for actuating the locking of the retractor comprising the combination of:
- an inertia member having an arcuate friction surface generated about a support axis, and including means pivoting the inertia member to the retractor housing for swinging movement about this axis from a rest position to a forward intermediate position under the impetus of vehicle deceleration forces acting directly on the mass of the inertia member during forward vehicle deceleration of a predetermined abruptness;
- annular driving means rotatable with the belt reel and engageable with the friction surface of the inertia member as this member swings to the intermediate position so that reel rotation resulting from belt unwinding as a belted occupant moves forwardly during the vehicle deceleration causes the driving means to move the inertia member to an actuated position; and
- control portions on the locking member and the inertia member that engage each other as the inertia member is driven to the actuated position so as to move the locking member against the bias of its spring means to locked position and to thereby prevent reel rotation and further belt unwinding.

3. In a vehicle body restraint belt retractor including a housing adaptable to be mounted on a vehicle body, a belt reel rotatably supported by the housing, spring means biasing the reel in a belt winding direction, a belt normally wound on the reel and unwound therefrom for positioning in an occupant restraining position, circumferentially spaced locking surfaces on the reel facing in the direction of unwinding belt movement, a locking member mounted on the housing for movement between a locked position where it is engageable with a selected locking surface on the reel to prevent belt unwinding and an unlocked position where these components are disengaged so as to allow belt unwinding, and spring means biasing the locking member to unlocked position, a mechanism for actuating the locking of the retractor comprising the combination of:
- an inertia member pivoted to the retractor housing for swinging movement from a depending rest position to a forward intermediate position under the impetus of vehicle deceleration forces acting directly on the mass of the inertia member during forward vehicle deceleration of a predetermined abruptness, the inertia member defining an aperture and having a friction member mounted on the inertia member within the aperture, and the friction member defining an arcuate friction surface generated about the axis of swinging movement of the inertia member;
- a shaft rotatable with the belt reel and having an annular driving surface which engages the arcuate surface of the friction member as the inertia member moves to the intermediate position so that reel rotation resulting from belt unwinding as a belted occupant moves forwardly during the vehicle deceleration causes the driving surface of the rotating shaft to move the inertia member to an actuated position; and
- engageable control portions on the locking member and the inertia member which are engaged to move the locking member against its spring bias to locked position as the inertia member is driven to the actuated position to thereby prevent reel rotation and further belt unwinding.

* * * * *